Feb. 28, 1933. P. J. CAROLUS 1,899,181
LAWN MOWER
Filed Oct. 23, 1930 4 Sheets-Sheet 1

Inventor
P. J. Carolus
By Watson E. Coleman
Attorney

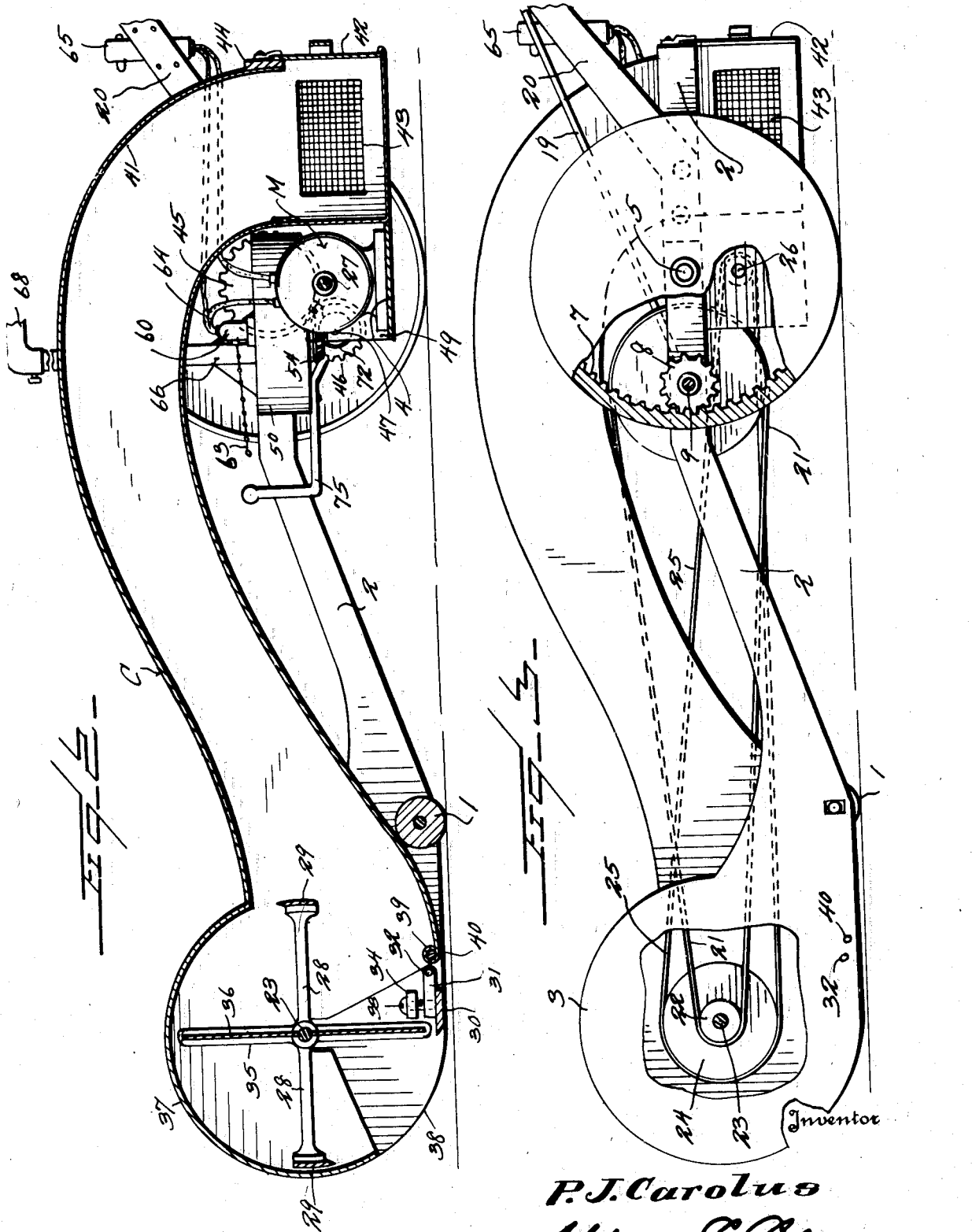

Feb. 28, 1933. P. J. CAROLUS 1,899,181
LAWN MOWER
Filed Oct. 23, 1930 4 Sheets-Sheet 3
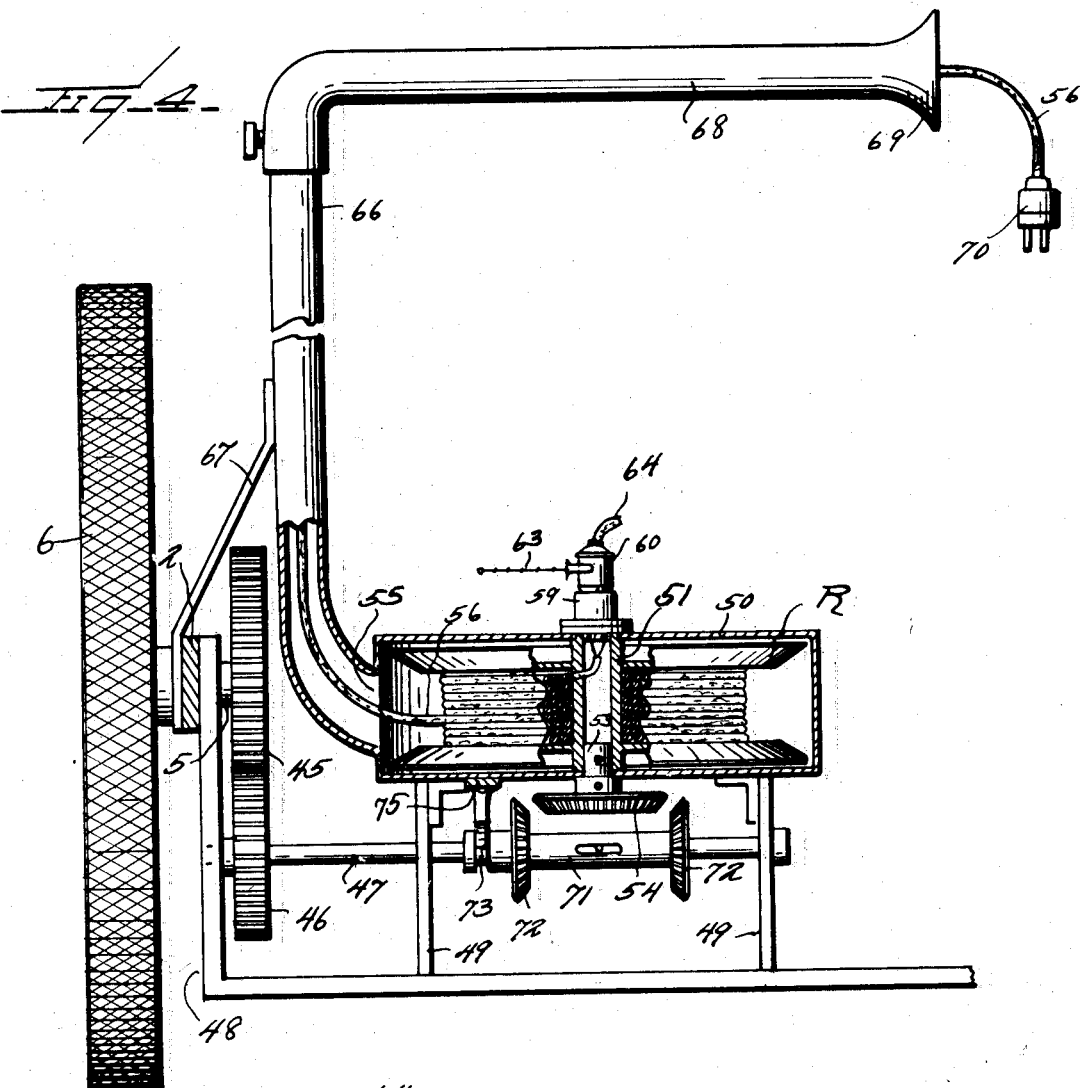
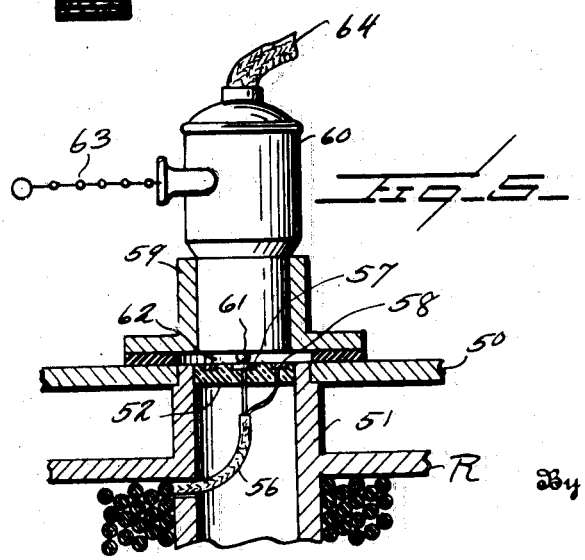
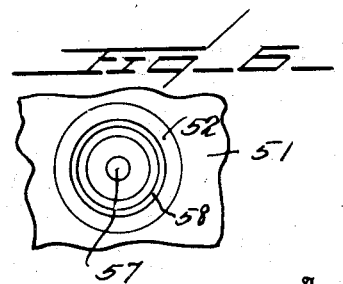
Inventor
P. J. Carolus
By Watson E. Coleman
Attorney Feb. 28, 1933.     P. J. CAROLUS     1,899,181
LAWN MOWER
Filed Oct. 23, 1930      4 Sheets-Sheet 4
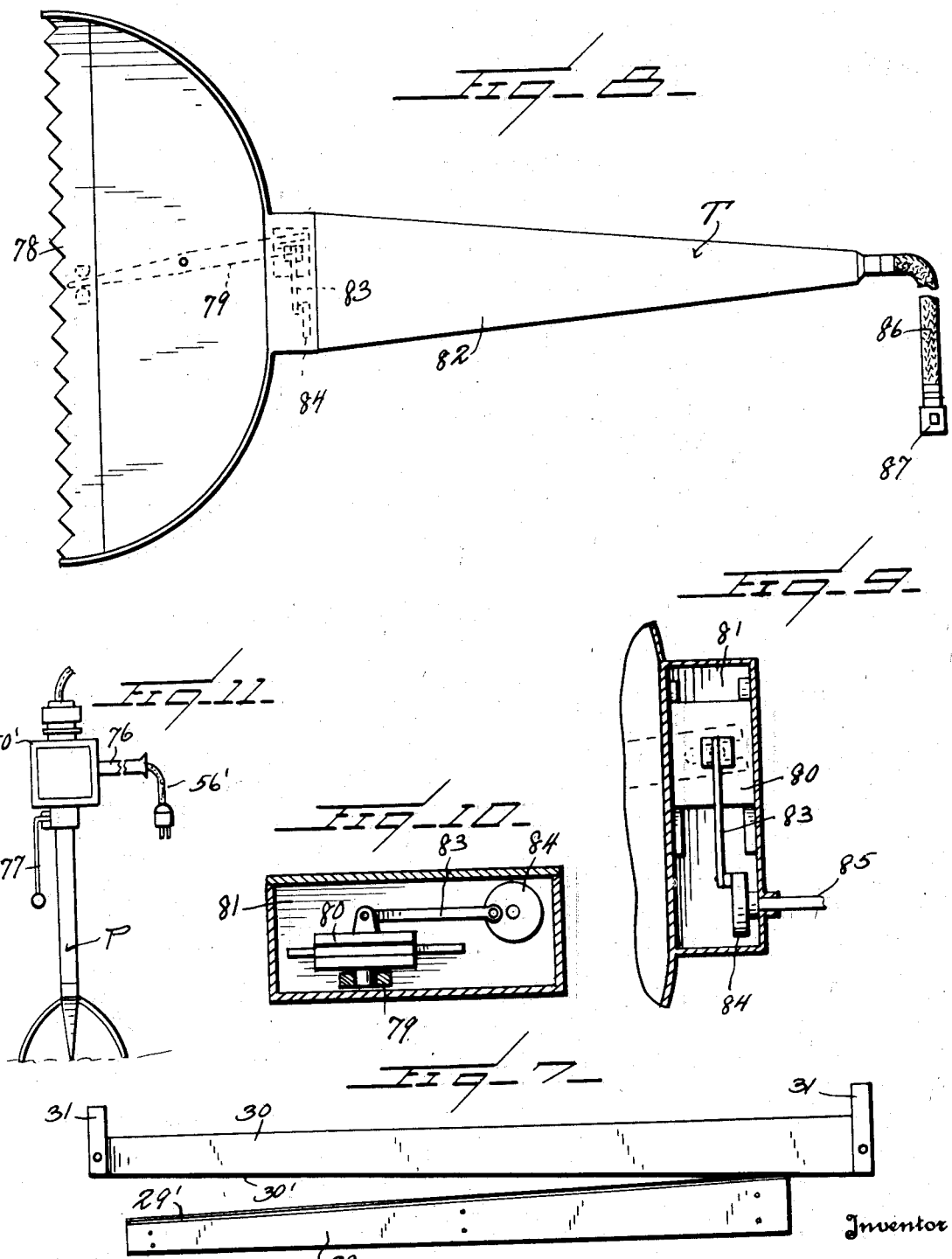

Patented Feb. 28, 1933

1,899,181

UNITED STATES PATENT OFFICE

PETER J. CAROLUS, OF ST. JOSEPH, MISSOURI

LAWN MOWER

Application filed October 23, 1930. Serial No. 490,763.

This invention relates to lawn mowers, and it is an object of the invention to provide a device of this kind which is power operated and which in addition to effectively cutting grass embodies means whereby cut grass may be readily collected thereby obviating the necessity of a separate raking operation.

It is also an object of the invention to provide a lawn mower adapted to be operated by an electric motor, together with means carried by the mower permitting the motor to be maintained in desired connection with a source of electrical energy while the mower is employed to cut grass over a relatively large area.

Another object of the invention is to provide a device of this kind wherein the electric motor for operating the mower is adapted to have electrical connection through the medium of a flexible cable, together with means carried by the mower for winding and unwinding such cable as the requirements of practice may necessitate.

An additional object of the invention is to provide a mower of this kind embodying the use of a rotary cutter coacting with a stationary blade, said stationary blade together with the blades of the rotary cutter having their cutting edges arranged on an incline with respect to the axes of said blades so that a shear cut is provided.

The invention also has for an object to provide for use in connection with a lawn mower of this kind a prop to be arranged as desired for coaction with the power line or cable whereby it is possible to permit the mower to be employed in connection with a very large area.

A still further object of the invention is to provide in connection with a mower of this kind means whereby a trimmer may be employed for cutting grass in places generally inaccessible by the mower proper and also for trimming hedges or the like.

The invention consists in the details of construction and in the combination and arrangement of the several parts of my improved lawn mower whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 2 is a longitudinal vertical sectional view taken through the mower as illustrated in Figure 1 with the grass carry-off chute in position;

Figure 3 is a view in side elevation of the mower as illustrated in Figure 1 with certain of the parts broken away;

Figure 4 is an enlarged fragmentary view partly in front elevation and partly in section particularly illustrating the reel carried by the mower;

Figure 5 is an enlarged fragmentary view partly in section and partly in elevation illustrating the means for effecting an electrical connection with the line or cable winding upon the reel;

Figure 6 is a fragmentary view in top plan particularly illustrating the connecting plug carried by the reel;

Figure 7 is a diagrammatic view in plan illustrating the stationary blade and one of the blades of the cutting member or reel as herein embodied;

Figure 8 is a view in plan of the trimming attachment as herein comprised;

Figure 9 is an enlarged fragmentary view partly in section and partly in top plan illustrating a portion of the operating means for the trimmer as illustrated in Figure 8;

Figure 10 is a view partly in section and partly in elevation of the operating means as illustrated in Figure 9;

Figure 11 is a view in elevation of a prop for the conductor or cable as herein set forth.

Figure 1:
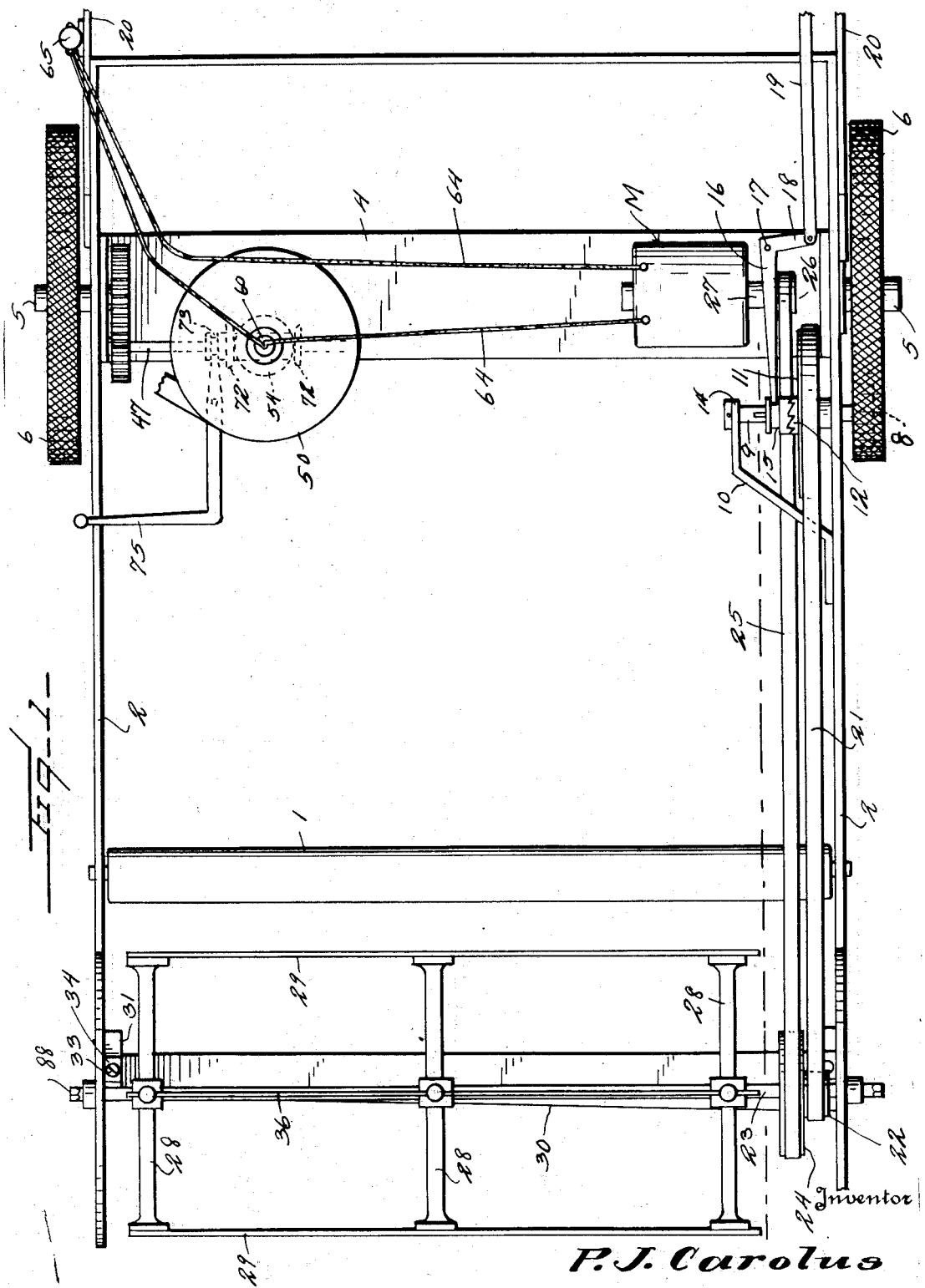
Figure 1 is a view in top plan of a mower constructed in accordance with an embodiment of my invention, certain of the parts being omitted.

As disclosed in the accompanying drawings, a ground engaging supporting roller 1 is interposed between and rotatably supported by the forward portions of the side members 2 of desired length and configuration. The forward extremity of each of these side members 2 is preferably enlarged, as at 3, to provide a substantially cylindrical head while the rear portion 2' of each of the side members 2 is upwardly offset.

The rear portions 2' of the side members 2 have interposed therebetween a saddle or platform 4 upon one end portion of which, or at a point adjacent one of the side members 2, is mounted an electric motor M. The portions 2' are provided with the outwardly directed aligned trunnions 5 upon which are mounted the ground engaging driving wheels 6. One of these wheels 6 is provided with an internal gear 7 having constantly in mesh therewith a pinion 8 carried by the stud shaft 9 extending through the adjacent side member 2 and rotatably supported thereby and by the inwardly disposed bracket 10.

Freely mounted on this shaft 9 is a pulley 11 having a clutch hub 12. Coacting with the clutch hub 12 is a clutch member 14 keyed to the stud shaft 9 for rotation therewith but capable of sliding movement lengthwise of said shaft 9 so that the member 14 may be moved into or out of clutching engagement with the clutch hub 12. The shifting of this member 14 may be accomplished in any manner desired. As particularly illustrated in Figure 1, the clutch member 14 is provided with a continuous annular groove 15 in which is received an end portion of an arm 16.

This arm 16 is supported in any desired manner for rocking movement, as at 17, by the table or saddle 4 and the pivoted end portion of said arm 16 is provided with an angularly disposed tail piece 18 with which is operatively engaged an extremity of an elongated rod 19. This rod 19 is adapted to extend rearwardly and upwardly along a handle member 20 whereby the operator at will may shift the rod 19 in the required direction to move the clutch member 14 either into or out of clutching engagement with the clutch hub 12.

The pulley 11 is in driven connection by a belt 21 or the like with a pulley 22 fixed to an end portion of a reel shaft 23. This shaft 23, as herein set forth, bridges the space between the side members 2 and is directed through and rotatably supported by the cylindrical portions 3 of said members 2. The extremities of the shaft 23 are herein disclosed as each projecting beyond the side members 2 for a purpose to be hereinafter referred to.

Also fixed to the reel shaft 23 is a second pulley 24 which is in driven connection by the belt 25 with a pulley 26 fixed to the drive shaft 27 of the motor M. Through the medium of the belts 21 and 25 and their associated pulleys the mower is caused to travel forwardly by the motor M and during which time the shaft 23 is caused to rotate at desired speed. The ratio of the various pulleys is such as may be best determined by practice and I, therefore, do not wish to be understood as limiting myself in any way in this respect other than to state that the driving should be such as to cause the mower to travel at a proper speed and for the shaft 23 to rotate to best advantage.

At desired points therealong and between the side members 2, the reel shaft 23 is provided with the oppositely directed arms 28 the outer ends of which having secured thereto the cutting blades 29. As particularly illustrated in Figure 7, the cutting edge 29a of each of the blades 29 is disposed on an incline lengthwise thereof with respect to the longitudinal axis of the blade 29 for coaction with a reversely inclined cutting edge 30' of the stationary cutting blade 30. By this relative arrangement of each of the blades 29 and blade 30 a mower is provided having a shear cutting action, thus materially facilitating the desired cutting of grass or the like.

The blade 30 at its opposite end portions is provided with rearwardly disposed arms 31 each of which being pivotally connected, as at 32, with a side member 2 so that said blade 30 may have adjustment in a vertical direction under control of a headed member or screw 33 directed from above through an inwardly disposed lug 34 carried by the adjacent side member 2 above an arm 31 with which the threaded member or screw 33 coacts.

The shaft 23 also has rotating therewith at points spaced lengthwise thereof the oppositely directed arms 35 arranged substantially at right angles to the arms 28. These arms 35 provide supports for the fan blades 36 which, when the mower is in operation, serve to throw a draft of air rearwardly of a chute C whereby the cut grass is effectively carried off and collected, thus obviating the necessity of a separate raking operation.

The chute C when applied substantially bridges the space between the side members 2 and has its forward end portion formed to provide a casing 37 in which the arms 28 and 35 rotate. The lower portion of this casing 37 is cut away, as at 38, so that the blades 29 and 30 will have requisite access to the grass to be cut. A marginal portion of the lower wall of the chute defining the lower or rear edge of the open portion 38 is returned to provide a barrel 39 through which is directed a rod 40, said rod being also operatively engaged with the side members 2 and thus providing means for effectively supporting the forward portion of the chute C in desired working position.

The chute C is disposed rearwardly on an upward curvature and terminates in a downwardly directed discharging portion 41. The discharge spout 41 discharges within the collecting receptacle 42 positioned therebeneath and being provided in its end walls with the screened openings 43 through which the air is adapted to escape. The cut grass as blown back through the chute C is collected within the receptacle 42 and when this receptacle is filled it may be readily removed for dumping.

The rear portion of the chute C may be supported in any desired manner but preferably by welding or otherwise connecting a wall of the chute to the rear cross member 44 connecting the rear extremities of the side members 2.

One of the trunnions 5 is rotatable with its associated wheel 6, said trunnion extending inwardly of the adjacent side member 2 and having fixed to said inwardly disposed portion a gear 45 constantly in mesh with a second gear 46.

This gear 46 is fixed to rotate with a shaft 47 rotatably supported by an end portion 48 of the saddle or platform 4 and by the upstanding posts or supports 49 carried by said saddle or platform.

The posts 49 support a housing 50 in which is arranged a reel R, said reel rotating about a vertically disposed axis. The reel R has a tubular hub 51, one end portion of which being closed by a plug or cap 52 while the opposite end portion has telescopically engaged therein and keyed thereto the stub shaft 53 carried by a bevel gear 54 underlying the housing 50.

The peripheral wall of the housing 50 is provided with an opening 55 providing an entrance for a conductor cable 56 which is adapted to be wound upon or unwound from the reel R. The plug 52 is of a material non-conductive of electricity and at its axial center is provided with an electrical contact 57 with which is engaged one of the conductors within the cable 56, while the second conductor within the cable 56 is in electrical connection with the annular contact member 58 carried by the outer surface of the plug 52 and concentric to the contact 57. The top wall of the housing carries a socket 59 in which is adapted to be inserted a plug 60, said plug when so inserted having a central contact 61 for electrical engagement with the contact 57 and with a second contact 62 for coaction with the annular contact member 58. By this arrangement the applied plug 60 will be in proper electrical connection with the conductors of the cable 56 at all times and more particularly when the reel is in rotation. The plug 60 comprises in its structure a conventional cut-out switch adapted to be operated by a pull chain 63 although, if desired, a cut-out of a different kind can be employed.

The contact members 61 and 62 of the plug 60 are in requisite electrical connection with the conductors 64 in proper connection with the motor M. Interposed in one of these conductors 64 is a second cut-off switch 65 of a conventional type and herein disclosed as carried by one of the handle members 20.

Carried by and extending upwardly from the housing 50 is a tubular member 66 leading from the opening 55 in the peripheral wall of the housing 50 and through which tubular member 60 the cable 56 is directed. This tubular member 66 is further supported in desired vertical position by a brace member 67 interposed between said member 66 and the adjacent side member 2.

The member 66 terminates a desired distance above the housing 50 and has in swiveled engagement with its upper end a horizontally disposed tubular member 68, the outer end portion 69 of which being of bell formation. The cable 56 extends outwardly through this horizontal extension 58 and the exterior extremity of the cable 56 carries a plug 70 or kindred electrical connection whereby said cable may be suitably coupled to a source of electrical energy, as a conventional household socket.

The cable 56 is intended to be of considerable length so that after being coupled with a desired source of electrical energy the mower may be caused to cover a considerable area during its working operation. This can be readily accomplished in view of the fact that the cable 56 may be caused to wind or unwind upon the reel R as may be required.

The shaft 47 below the housing 50 has keyed thereto for rotation therewith a sleeve 71, said sleeve, however, being capable of independent movement lengthwise of the shaft 47. The sleeve 71 at opposite sides of the gear 54 is provided with the bevel gears 72 providing means whereby upon shifting of the sleeve 71 to bring one of the gears 72 in engagement with the gear 54 the reel R will be rotated in one direction and upon reverse shifting of the sleeve 71, the second gear 72 will be brought into engagement with the gear 54 to effect a retrograde rotation of the reel R.

As particularly illustrated in Figure 4, it is to be noted that the gears 72 are spaced apart a distance sufficient to enable the sleeve 71 to be adjusted in a position to have both of the gears 72 free of the gear 54 and under which conditions the reel R is neutral with respect to the shaft 47.

One end portion of the sleeve 71 has operatively engaged therewith a rocking fork 73 whereby the sleeve 71 may be adjusted as desired. This fork 73 is adapted to be operated as desired by an arm 75 extending to one side of the machine and at a point readily accessible by the operator.

It sometimes occurs that the field or area to be traversed by the mower is of such size as to require a cable of a length greater than that generally employed in connection with the reel R. Under such circumstances a supplemental cable may be employed the same coacting with a reel similar to the reel R carried by a prop P as illustrated in Figure 11. This prop P as disclosed is of a character to be readily placed at any desired point upon a lawn or field.

The housing 50' carried by this prop P is preferably in swiveled connection therewith so that an entrance tube 76 for the housing 50' may be conveniently disposed in the desired direction toward the source of supply with which the supplemental cable 56' is adapted to be coupled. The housing 50' may be readily locked, as indicated at 77, in its desired adjusted position.

In the cutting of lawns it often occurs that there are places inaccessible by the mower proper and therefore requiring a separate trimming or cutting operation. In order to do this I provide a trimming device T as particularly illustrated in Figure 8 of the accompanying drawings, and which includes in its structure a reciprocating cutter bar 78 operated by a rock arm 79. This arm 79 has one end portion operatively engaged with a reciprocating block 80 mounted within a chamber 81 provided in the handle portion 82 of the trimmer. The block 80 has operatively engaged therewith a pitman 83 which in turn is operatively engaged with a disc 84 carried by a shaft 85 extending upwardly through the handle portion 82 of the trimmer. The outer end of this shaft 85 has coupled thereto a flexible shaft 86 of desired length. This flexible shaft 86 carries a coupling 87 permitting the shaft 86 to be connected to any suitable driven part of the mower proper, as for example an extended portion 88 of the reel shaft 23.

From the foregoing description it is thought to be obvious that a lawn mower constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In a lawn mower construction including a cutting reel having cutting blades; fan blades carried by the reel and positioned between successive cutter blades whereby to blow the cut grass rearwardly of the reel.

2. In a lawn mower construction including a cutting reel; cutters carried by the reel, blower elements carried by the reel between successive cutters whereby to blow the cut grass rearwardly of the reel, and a grass collector positioned rearwardly of said cutting reel and receiving the grass from said blower elements.

3. In a lawn mower construction including a frame and rotatable cutting blades; a collecting member carried by the frame, and means rotatable with and disposed intermediate successive blades for discharging cut grass into said member.

4. A mower comprising a frame, a cutting reel carried thereby, cutters carried by the reel, fan blades carried by the reel intermediate successive cutters, and a collecting chute carried by the frame and through which the fan blades of the reel direct the severed grass or the like.

5. A mower comprising a frame, a cutting reel carried thereby, cutters carried by the reel, fan blades carried by the reel intermediate successive cutters, a collecting chute carried by the frame and through which the fan blades of the reel direct the severed grass or the like, and a collecting receptacle to which the chute discharges.

6. In a lawn mower construction including a frame and cutting members carried by the frame, and rotatable fan members carried by the frame intermediate successive cutting members.

In testimony whereof I hereunto affix my signature.

PETER J. CAROLUS.